United States Patent [19]

Koller

[11] Patent Number: 5,067,600
[45] Date of Patent: Nov. 26, 1991

[54] PRECISION OVERLOAD CLUTCH APPARATUS FOR AUTOMATED MACHINERY

[75] Inventor: Frank H. Koller, Norridge, Ill.

[73] Assignee: Emerson Electric Co., St. Louis, Mo.

[21] Appl. No.: 654,600

[22] Filed: Feb. 13, 1991

[51] Int. Cl.⁵ .............................................. F16D 7/02
[52] U.S. Cl. .................................. 192/56 R; 192/150; 464/38
[58] Field of Search ................. 192/56 R, 150; 464/38

[56] References Cited

U.S. PATENT DOCUMENTS

| | | | |
|---|---|---|---|
| 998,615 | 7/1911 | Huneke | 192/56 R |
| 1,015,394 | 1/1912 | Mustin | 192/56 R |
| 2,837,190 | 6/1958 | Blakeslee | 192/56 R |
| 3,002,206 | 10/1961 | Johnson | 192/56 R |
| 3,282,387 | 11/1966 | Becker et al. | 192/150 |
| 3,379,034 | 4/1968 | Gustafson | 464/38 |
| 3,546,897 | 12/1970 | Kenny | 464/38 |
| 3,831,724 | 8/1974 | Baer | 192/56 |
| 4,197,931 | 4/1980 | Norcia | 192/106 |
| 4,294,340 | 10/1981 | Kunze | 192/56 |
| 4,300,364 | 11/1981 | van der Lely et al. | 64/28 |
| 4,548,305 | 10/1985 | Anderson | 192/56 |
| 4,553,652 | 11/1985 | Fallos | 464/38 |
| 4,599,019 | 7/1986 | Ueberall | 408/139 |
| 4,668,206 | 5/1987 | Fukumoto | 464/36 |
| 4,744,447 | 5/1988 | Kato et al. | 192/56 R |
| 4,828,095 | 5/1989 | Kilwin | 192/150 |
| 4,838,829 | 6/1989 | Maurer et al. | 464/38 |

OTHER PUBLICATIONS

Copy of Agathon Roller Guides from Agathon Ltd., Machine Tool Works, Switzerland, Undated, but believed to have been distributed in 1975.
Two-Sheet Flyer from Tool Mate Corp., Cincinnati, Ohio, Entitled "Light Pressure" and Medium Pressure (Undated).
Brochure of "San-Savr" Torque Limiters from Sankyo America Inc., Sydney, Ohio, believed to have been distributed in 1988.

Primary Examiner—Allan D. Herrmann
Assistant Examiner—Nicholas Whitelaw
Attorney, Agent, or Firm—Tilton, Fallon, Lungmus

[57] ABSTRACT

An adjustable, precision overload clutch device is disclosed as comprising a rotating driving member drivingly coupled by spring-urged detent plunger members to a driven member, in which bearings are provided for journalably mounting the head of each plunger member to the driving member, and spring adjusting members which permit pre-loading by the spring of each detent plunger and associated bearings. This combination allows the overload clutch to achieve a high locational accuracy upon each resetting after clearance of an obstruction. Elastomeric springs are preferably used for the detent plunger springs, so that by use of the adjusting member, the overload torque range for the precision overload clutch can be substantially adjusted (within limits) as desired for a given application. The clutch also includes structure to make it moisture resistant, including when coupled to an intermittent drive unit, such as a motor-driven indexer, for example.

17 Claims, 2 Drawing Sheets

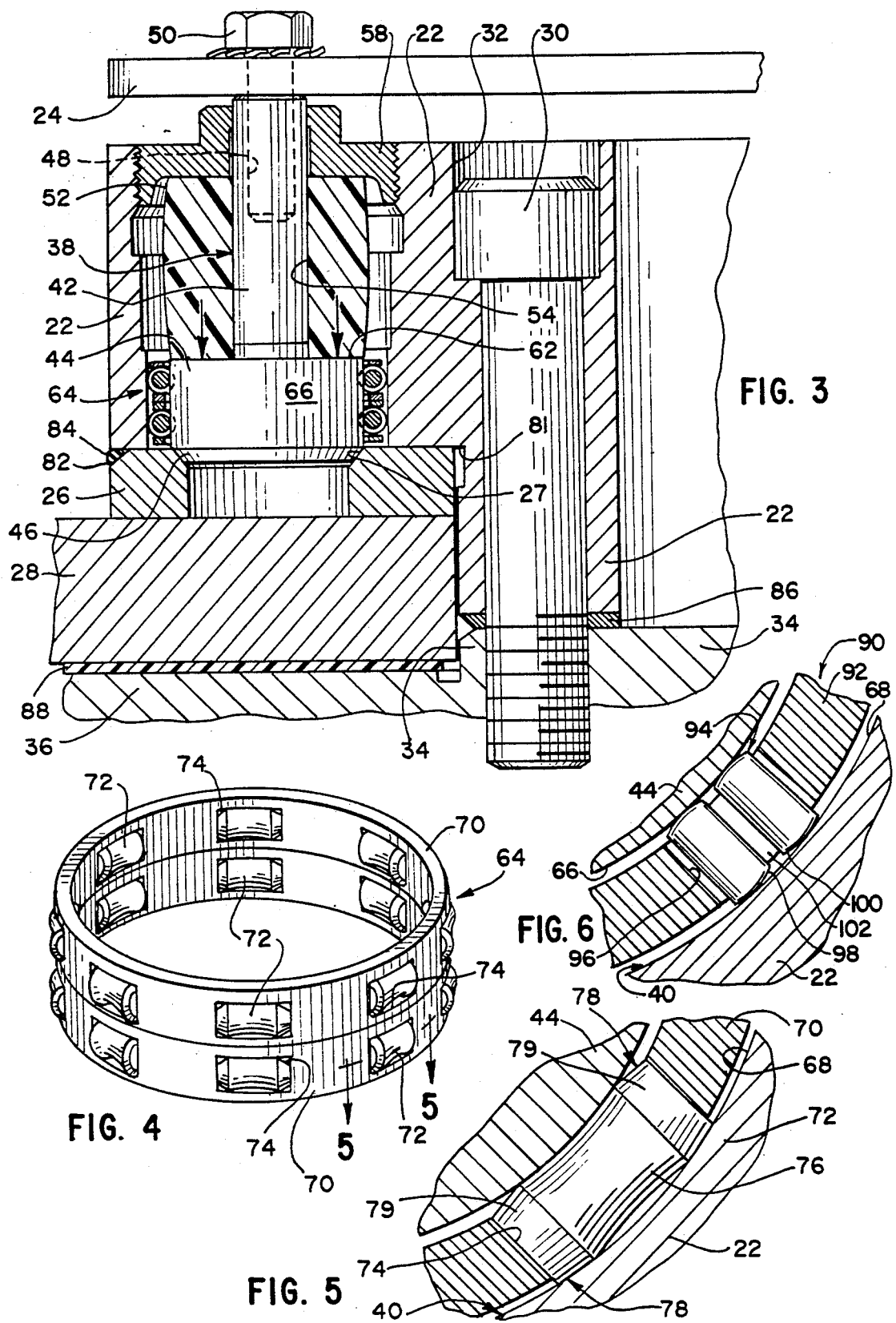

PRECISION OVERLOAD CLUTCH APPARATUS FOR AUTOMATED MACHINERY

FIELD OF THE INVENTION

This invention relates to overload clutch apparatus, and more specifically to a high precision detent type overload clutch having plunger bearings.

BACKGROUND OF THE INVENTION

There are various types of overload clutches for use with automated machinery having intermittent drives. These are typified by U.S. Pat. Nos. 3,282,387; 3,546,897; 4,744,447 and 4,828,095. The 4,828,095 clutch device utilizes ball detents and detents seats, while the 3,546,897 and 3,282,387 devices use plunger-type detent members with mechanical springs. The 4,744,447 device uses transmission roller members and mechanical disk springs to create the necessary biased clutch coupling.

However, there are operating deficiencies in all such overload clutch devices. For example, with the prior plunger detent-type overload clutches there is undesirable play, i.e., backlash, inherently created at the interface of the detents with the drive member. This substantially effects repositioning accuracy for the associated tooling, especially where long reaches for such tooling are involved.

When mechanical springs (whether of the conventional coil or disk type) are used to bias the detent plunger against the associated wear plate, there is inherently only one given spring force available. Thus, such mechanical springs have to be exchanged for a different size spring, i.e. ones with different spring ratings, when one needs to change clutch capacity. Further, undesirable moisture and other contaminants can often enter the detent spring chambers due to the clearance (between the clutch body and the drive plate) inherently created during overload clutch assembly.

The foregoing problems in the prior art are overcome by the present invention which provides a high precision overload clutch of the plunger-detent type, having roller or ball bearings which journal the head of each plunger element. Preferably, urethane springs are used to bias each plunger element against the drive plate. There are means for adjusting each spring to properly pre-load the roller bearings and the plunger head, thereby providing precise positioning of each plunger head relative to the associated drive plate. By providing such pre-loading, there is essentially no backlash, i.e. unnecessary movement, created at the interface of the plunger heads and the drive plate, such as when the clutch is reset after an obstruction has been sensed and cleared. By the preferable use of urethane rather than mechanical springs, a range of adjustability (within limits) for the overload clutch's sensing torque can be provided by a given size urethane spring, and hence, by a given size clutch. That is, done through use of an adjustment member for each urethane spring, the torque for a particular clutch can be selectively changed to accommodate the torque load required for a given application. Thus, contrary to prior art mechanical springs, the urethane springs of the present overload clutch do not need to be exchanged for different mechanical springs when a different torque load is required.

Thus, it is an object of the present invention to provide an overload clutch providing a range of operating torque loads for a given set of detent plunger springs.

It is a further object to provide an overload clutch of the spring-urged, detent plunger type where the plunger members are preloaded against the drive plate to prevent unwanted backlash and to provide high precision locational accuracy for the clutch upon each reset.

It is yet a further object to provide an overload clutch having detent plunger members which are journaled by bearing means so as to assure locational accuracy.

The means by which the foregoing and other objects of the present invention are accomplished and the manner of their accomplishment will be readily understood from the following specification upon reference to the accompanying drawings, in which:

FIG. 3 is an enlarged side sectional view of the detent plunger and spring component area of the clutch of FIG. 1.

FIG. 4 is an enlarged perspective view of the roller bearings used for the present clutch;

FIG. 5 is an enlarged plan view of a roller bearing of the present invention, viewed along lines 5—5 of FIG. 4; and FIG. 6 is an enlarged plan view, similar to FIG. 5, of a modified roller bearing of the present invention.

DESCRIPTION OF THE PREFERRED EMBODIMENT

Figure 1:
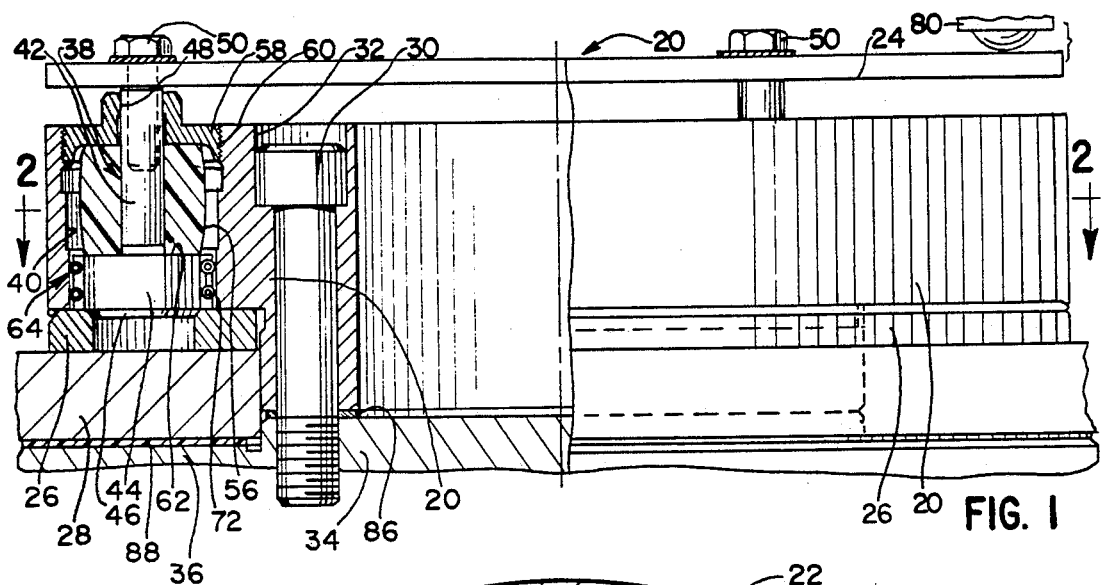
FIG. 1 is a side elevation view, partly in section for better viewing, of the precision overload clutch of the present invention.

Having reference to the drawings, wherein like reference numerals indicate corresponding elements, there is shown in FIG. 1 an illustration of the precision overload clutch of the present invention, generally denoted by reference numeral 20. The clutch 20 is circular in shape (see FIG. 2) and comprises a clutch body portion 22, a detector plate 24, and a drive plate 26. The overload clutch 20 operates to drive a driven plate 28; this could be the dial plate of an automated assembly indexing machine, for example, or of another type intermittent drive device. The drive plate 26 includes a series of chamfered drive openings, each generally denoted by reference number 27. The clutch 20 is affixed, via threaded fasteners 30 placed through fastener openings 32, to an upstanding hub portion 34 of an output drive member 36. Drive member 36 could be the output of a motor-driven indexer device, for example.

Each of a series of detent plunger members, each generally denoted by reference numeral 38, is slidably mounted within a respective plunger receiving opening 40 (see FIGS. 1 and 2) formed in clutch body 22. Each detent plunger 38 comprises a shaft portion 42 terminating at one end in an enlarged plunger head 44 having a chamfered peripheral edge 46 and terminating at its other end in a threaded fastener receiving opening 48. The head portion 44 is intended to be normally seated within, and has its chamfered edge 46 bear against, the chamfered drive opening 27 of drive plate 26. Threaded fastener 50 is received within the threaded opening 48 and tightens the end of shaft 42 against the underneath side of detector plate 24. In this fashion the combination of detent plungers 38 and detector plate 24 operate as an integral unit.

As best seen in FIG. 3, a cylindrically-shaped spring member, generally denoted by reference number 52 and having a central opening 54, is fitted over and retained on the plunger shaft 42. Preferably, the outer diameter of the spring 52 is sufficiently less than the inner diameter of the plunger opening 40 formed in clutch body 22, so as to permit expansion of the sides of the spring 52 when it is properly compressed along its axial length (see curved outer sides 56 of compressed spring 52 in FIGS. 1 and 3). A spring adjusting hex nut 58 is threadedly received within the upper threaded end 60 of plunger opening 40. Through tightening, adjusting nut 58 is used to selectively, adjustably axially compress the spring 52 against wall 62 of the plunger head 44.

A specially-configured series of linear roller bearings 64 are mounted between the outer peripheral edge 66 of plunger head 44 and the inner diameter wall 68 of plunger opening 40 adjacent head 44. Preferably, the roller bearing 64 are two in number (see FIGS. 3 and 4) with each comprising a ring member 70 having a plurality of specially-configured roller members 72. Each roller member 72 is retained by the associated ring member 70 within a rectangular-shaped through hole 74.

As seen in FIG. 5, each linear roller member 72 is specially configured so as to have separate extended contact surfaces (rather than point contacts) with several adjoining elements. More specifically, each roller member 72 has a generally concave shaped central body portion 76 which bears against the outer peripheral edge 66 of a plunger head 44. There is also formed at each end of each roller member 72 a generally truncated, conically shaped end portion 78. The roller ends 78 each have a slightly convex radial edge 79 which respectively coincides with and bears against the inner diameter wall 68 of plunger opening 40. The respective contact surfaces on central body portion 76 and end portions 78 provide each roller member 72 with multi-surface bearing contact at any given instance, to both the plunger head 44 and clutch body 22. This substantial, extended line bearing contact provided by the bearings 64 permits a much high load carrying capacity than would be available with ball bearing members.

Thus, the presence of the roller bearings 64 acts to significantly eliminate backlash within clutch 20 by preventing any excessive unwanted lateral movement of the plunger head 44 relative to the plunger opening 40 of clutch body 22. Also limited by bearings 64 is unwanted movement of the plunger head 44 relative to the chamfered drive opening 27 of drive plate 26. Moreover, so as to further eliminate unwanted backlash between the plunger head 44 and clutch body 22, each plunger head 44 is pre-loaded against the associated drive opening 27, and hence the drive plate 26. That is, each detent plunger 38 is both forced axially by spring 52 against drive plate 26 and also is positionally retained within clutch body 22 by roller bearing 64. It will be understood that the roller bearings 64 are also pre-loaded by the spring 52.

One known source for the type of roller bearing 64 used in the present invention is made by Agathon Ltd. Machine Tool Works of Switzerland. Alternatively, such roller bearing members 64 could be replaced by suitable, well-known ball bearing units, such as caged ball bearings (not shown).

Preferably, spring 52 is formed of an elastomeric material, such as urethane, for example. Such a urethane spring 52 preferably has a durometer hardness rating of 95 on the Shore A scale, but the same could range between 70 to 95 on said scale. In one embodiment made in connection in accordance with the present invention, a urethane material known as POWERTHANE (Trademark) was used to form a spring 52 having an outer diameter (when measured in an undeflected condition) of 1.00 inches and an axial length of 1.00 inches. The spring 52 so made included a plunger shaft opening 54 of 0.375 inches in diameter.

As seen in FIG. 3, tightening the threaded adjusting nut 58 in a direction downwardly towards the plunger head 44 causes the outer cylindrical sides 56 of spring 52 to bulge outwardly (see FIGS. 1 and 3); this tightening sets up the desired spring force within spring 52. At the same time, such an adjustment of the nut 58 causes the spring 52 to exert a downwardly-directed force (in the direction of the arrows in FIG. 3) against the plunger head 44, thereby forcing head 44 against drive plate 26. This creation of a spring-biasing force on plunger head 44 operates to maintain the driving engagement of the clutch 20. That is, when no obstruction is sensed by the clutch, the clutch continues to operate in its fully integrated configuration (of FIGS. 1 and 3) where each plunger head 44 is seated within its respective chamfered drive opening 27 of drive plate 26.

Figure 2:
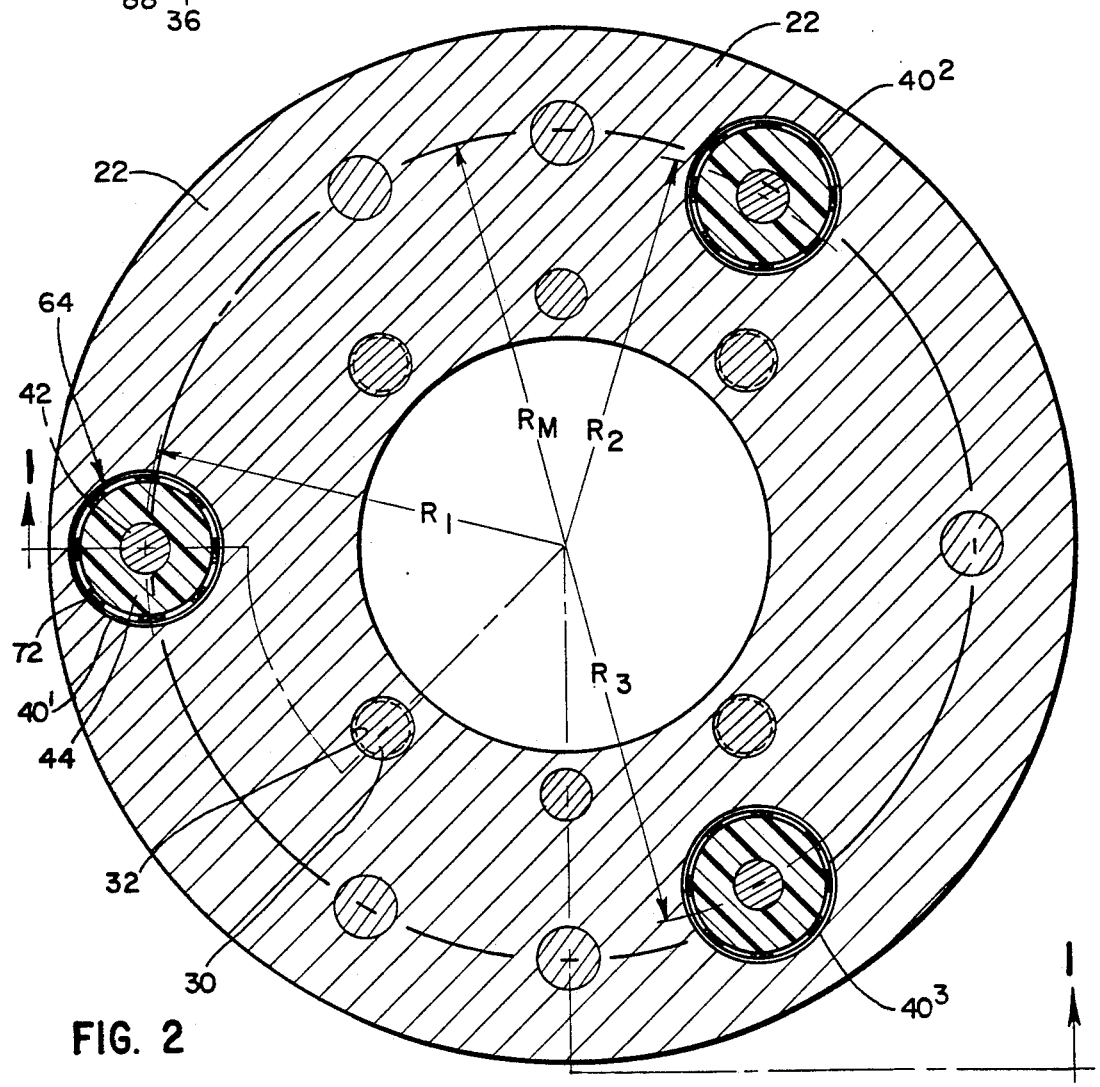
FIG. 2 is a section view of the clutch of FIG. 1, taken at lines 2—2 thereof.

As best seen in FIG. 2, a plurality of plunger openings 40, with associated detent plungers 38, are formed within clutch body 22. Preferably, each plunger opening 40 is formed at a different radial dimension from the center of clutch body 22 relative to the other openings 40. This is advantageous for clutch resetting registration purposes (see the three respective plunger openings 40 in FIG. 2, designated as openings $40^1$, $40^2$, and $40^3$). The opening $40^1$ is formed at a radial distance of $R^1$ from the center line of clutch body 22, while plunger opening $40^2$ is formed at a distance of $R^2$, and so forth. The chamfered drive openings 27 are similarly so positioned on drive plate 26. Accordingly, due to the different radial positions of the respective plunger openings 40, and hence, of the detent plungers 38 relative to the drive openings 27 in drive shaft 26, the clutch 20 can only be reset in one configuration.

In a well known fashion, the precision overload clutch 20 of the present invention can sense an overload condition, i.e. an obstruction placing a force on the associated tooling or workpiece (neither shown, but either or both can be carried by the driven plate 28). When an obstruction occurs, the driven plate 28 and drive plate 26 are stopped for movement, whereby the chamfered edge of each plunger head 44 operates against the chamfered drive of the associated opening 27 to elevate the integral combination of detent plungers 38 and detector plate 24. This occurs until the detector plate 24 engages the detector switch 80 (see FIG. 1). In a well known fashion, activation of switch 80 operates to shut off the drive motor (not shown) by which the overload clutch 20 is driven. Then, after the obstruction sensed by clutch 20 is cleared, the clutch can be easily reset by rotating the same (relative to the still stationery drive plate 26 and driven plate 28) until the proper registration (of the respective plunger openings 40 and detent plungers 38 vis-a-vis the respective chamfered drive openings 27 of drive plate 26) is reached, whereupon clutch 20 is again placed in its engaged drive configuration as depicted in FIGS. 1 and 3.

It will be understood that there is an inherent assembly clearance (ranging typically from 0.002" to 0.004") which occurs between the top of drive plate 26 and the adjoining undersurface 81 of clutch body 22 (see FIGS. 1 and 3). Unwanted infiltration of moisture can occur at that location. A chamfer 82 is formed on the outer upper edge of drive plate 26. An elastomeric O-ring 84 is used to seat between chamfer 82 and surface 81 of clutch body 22. As so positioned, the 0-ring 84 acts to prevent moisture and other undesirable contaminants from entering the above described mechanical clearance. Additionally, when the urethane spring 52 is compressed by the adjusting nut 52, the spring 52 acts as a gasket about plunger shaft 42 to prevent unwanted contaminants from getting through its central clearance hole 54. Additionally, a relatively thin shim seal 86 is preferably placed between the mating surfaces of hub portion 34 of output member 36 and clutch body 22 (see FIG. 3). Similarly, a thin spacer seal 88 is used between the driven plate 28 and the output member 36. Preferably, the shim seal 86 and spacer seal 88 are flat ring members made of a suitable flexible material, such as Teflon, for example. Such seals 86, 88 act to reduce friction and wear of the associated clutch drive components.

Importantly, it was found that by using a urethane spring 52 as described above, only three plunger openings 40 and three detent plungers 38 were required. This is in contrast to equivalent sized prior overload clutches with mechanical springs where four detent pockets were required. It is believed that urethane springs provide substantially more spring power in a smaller package than equivalent capacity mechanical springs. In effect, the present precision overload clutch can be made in a smaller size for a given overload torque rating. However, it is to be understood that with clutches of larger size or those clutches which required larger capacity torque loadings, it may well be that four, five or even more such detent plungers are required. Nevertheless, the structure of the present invention can be satisfactorily used to create such overload clutches, regardless of the number of detent plungers required.

In one embodiment made in accordance with the present invention, per FIG. 2, the clutch had an overall diameter of 8.56 inches and generated 10,000 inch-pounds of torque. It was found that adjustment of the three urethane springs 52, via spring adjustment nuts 58, could create torque loadings ranging from 1900 inch- pounds to 10,000 inch- pounds. This was not possible with the prior art overload clutches which used steel springs.

Because of the important pre-loading provided by the present overload clutch 20, as well as through use of the roller bearings 64, a high precision positional accuracy can be provided by the present overload clutch 20. In fact, the above-described embodiment made in accordance with the present invention was found to have a "repeat" positional accuracy of within ten arc seconds once the clutch was reset, i.e. realigned and repositioned.

Thus, with the present invention the precision overload clutch 20 eliminates the undesirable so-called slop or backlash present in the plungers of the prior art design overload clutches. This high precision feature is especially important where the associated tooling spans long reaches. Further the clutch of the present invention minimizes frictional drive wear between mating clutch surfaces.

As an alternate embodiment, the urethane springs 52 of the present invention could be replaced with mechanical coil springs without eliminating the backlash- prevention feature of the present invention. However, one would lose the range of adjustability provided by the urethane springs 52 and adjusting nuts 58.

Additionally, as another embodiment, there is shown in FIG. 6 (with the same elements as in FIG. 5 bearing the same reference numerals) a modified form of a specially-configured series of linear roller bearings 90, which are for use with the present invention instead of the series of linear roller bearings 64. In this modified version of bearings, which are preferred over bearings 64, the linear roller bearings 90 are again mounted two in number (in similar fashion to the two rings shown in FIGS. 3 and 4), with each bearing 90 comprising a ring member 92 having a plurality of specially-configured roller members 94. Each roller member 94 is retained by the associated ring member 92 within a generally rectangular-shaped through hole 96.

As seen in FIG. 6, each linear roller member 94 is specially-configured so as to have separate extended contact surfaces with several adjoining elements. That is, each roller member 94 has a pair of barrel-shaped, generally centrally located roller surfaces 98, 100, separated by a channel 102. These barrel-shaped roller surfaces 98, 100 each contact both the outer peripheral edge 66 of a plunger head 44, as well as bear against the inner diameter wall 68 of the plunger opening 40. Thus, these generally barrel-shaped surfaces 98, 100 (similar in fashion to the bearing surfaces formed on roller member 72 of bearing 64) provide each roller member 94 with multi-surface bearing contact at any given instance, to both the plunger head 44 and the clutch body 22. Such multi-surface bearing contact provided by modified bearings 90 permit a high load carrying capacity for the present precision overload clutch device. In fact, it is understood that the linear roller bearings 90 exhibit an even higher load-carrying capacity than provided by the linear roller bearings 64. Moreover, contrary to the roller bearings 64, the roller bearing members 94, with their barrel-shaped roller surfaces 98, 100, do not exhibit any so-called "skewing", i.e., they do not tilt and tend to run sideways relative to the plunger head 44 and the clutch body 22. This modified, and preferred, type of roller bearing 90 is also available from Agathon Ltd.

From the foregoing, it is believed that those skilled in the art will readily appreciate the unique features and advantages of the present invention over previous types of overload clutches. Further, it is to be understood that while the present invention has been described in relation to a particular preferred embodiment as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

I claim:

1. In an overload clutch of the type including a drive plate having a plurality of detent receiving openings, a clutch body portion, a plurality of plunger detent members slidably mounted in plunger openings formed in the clutch body portion, each detent member having a head portion, and springs elements respectively biasing the plunger detent member towards said drive plate so that the plunger detent head portions are normally respectively seated in the detent receiving openings, the improvement comprising:

bearing means journaled within each respective opening formed in the clutch body portion and mounted about the head portion of each plunger detent member to minimize unwanted backlash movement of said detent head portion relative to the drive plate when said head portion is normally seated in the associated plunger receiving opening thereof.

2. The invention of claim 1, wherein said bearing means comprises roller bearing means.

3. The invention of claim 2, wherein said roller bearing means comprises linear roller bearings.

4. The invention of claim 2, wherein said roller bearing means comprises at least one bearing retainer ring member, a plurality of roller elements retained by said ring member, each of said roller elements having a central, axially aligned, generally concave portion which terminates at each end thereof in a generally truncated conic portion, whereby said central concave portion bearingly journals the outer peripheral surface of said plunger detent head portion, and said conic end portions bearingly journal an inner wall surface of the associated said plunger openings formed in said clutch body.

5. The invention of claim 2, wherein said roller bearing means comprises at least one bearing retainer ring member, a plurality of roller elements retained by said ring member, each of said roller elements having at least two generally centrally located barrel-shaped roller surfaces, said roller surfaces bearingly journaling the outer peripheral surface of said plunger detent head portion and an inner wall surface of the associated said plunger openings formed in said clutch body.

6. The invention of claim 1, wherein the spring elements respectively comprise an elastomeric spring member mounted on a respective plunger detent member.

7. The invention of claim 6, and spring adjustment means operable to compress said elastomeric spring members so as to adjustably vary the torque rating of said overload clutch to accommodate a given clutch application.

8. The invention of claim 7, wherein said adjustment means comprises a threaded adjustment element threadedly mounted within said plunger opening and operable to adjustably bias said elastomeric spring member against said head portion of said plunger detent member.

9. An improved overload clutch apparatus for an intermittent drive device driving a driven member and having an output member, comprising:
a clutch body having at least one plunger cavity formed therein;
a drive plate facing said clutch body, said drive plate having at least one plunger receiving drive opening formed therein operable to register with said plunger cavity;
a plunger detent member slidably mounted within said plunger cavity and having a head portion operable to seatingly engage within said plunger receiving drive opening; and
elastomeric spring means mounted on said plunger detent member and operable to bias said head portion towards said drive plate.

10. The invention of claim 9, and bearing means journalably mounted within said plunger receiving opening between said clutch body and said plunger detent head portion for minimizing unwanted backlash movement between said detent plunger and said drive plate.

11. The invention of claim 9, and adjustment means mounted on said clutch body for selectively adjustably compressing said elastomeric spring means against said plunger detent head portion so as to vary the overload torque capacity of said overload clutch apparatus as required for a given application.

12. The invention of claim 9, wherein said elastomeric spring means is formed of a urethane material.

13. The invention of claim 12, wherein said urethane material has a durometer reading in the range of from 70 to 95 on the Shore A scale.

14. The invention of claim 9, and low friction means separating said driven member from said output member of said intermittent drive device so as to reduce friction wear between the same during operation of said overload clutch apparatus.

15. The invention of claim 14, wherein said low friction means comprises a Nylon disc member.

16. The invention of claim 9, and seal means mounted said drive plate and operable to substantially prevent entry of water and other contaminants into said detent receiving drive openings.

17. The invention of claim 16, wherein said seal means comprises an 0-ring mounted between said driven plate and associated drive members.

* * * * *